United States Patent [19]

Ghavamikia

[11] Patent Number: 4,601,936
[45] Date of Patent: Jul. 22, 1986

[54] GLASS FIBER MAT REINFORCED PLASTIC PANELS WITHOUT THE FIBER READOUT DEFECT

[75] Inventor: Hamid Ghavamikia, Sterling Heights, Mich.

[73] Assignee: General Motors Corporation, Detroit, Mich.

[21] Appl. No.: 718,653

[22] Filed: Apr. 1, 1985

[51] Int. Cl.$^4$ .............................................. B32B 3/30
[52] U.S. Cl. .................................. 428/119; 428/172; 428/180; 428/273
[58] Field of Search ............... 428/180, 141, 172, 273, 428/119

[56] References Cited

U.S. PATENT DOCUMENTS 2,893,889  7/1959  Schuetz et al. ................. 428/273 X Primary Examiner—Alexander S. Thomas
Attorney, Agent, or Firm—Randy W. Tung

[57] ABSTRACT

A method of making glass fiber mat reinforced RIM panels wherein glass fibers are kept away at a distance from the panel surface in a precisely controlled manner to avoid fiber readout defect. The method is carried out by molding glass fiber mats in a matched metal mold where at least one of the interior mold surface is etched with equally spaced, closely packed minute pockets or valleys of truncated pyramid shape. Fiber glass mat reinforced panels thus produced have a textured panel surface with a multiplicity of minute truncated pyramid like protuberances. Glass fibers are excluded from such protuberances to produce a panel surface without the fiber readout defect.

2 Claims, 3 Drawing Figures

GLASS FIBER MAT REINFORCED PLASTIC PANELS WITHOUT THE FIBER READOUT DEFECT

FIELD OF THE INVENTION

The present invention relates to a method of producing glass fiber reinforced plastic panels and, more particularly, relates to a method of producing a glass fiber mat reinforced plastic panel without the fiber readout defect on the surface of the panel.

BACKGROUND OF THE INVENTION

Glass fiber reinforced plastics have been used widely in the automotive industry in recent years. These plastics include sheet molding compound, glass fiber reinforced reaction injection moldable materials and various other glass fiber reinforced plastics. The advantages of lightweight, high strength, rust proofing and relatively low cost make these materials ideal for many automotive exterior body panel applications.

Of these materials, the reinforced reaction injection moldable material (RRIM) is of particular interest of the automotive industry because it can be processed economically with relatively low cost tooling. RRIM materials filled with glass fiber mats have greatly improved stiffness and dimensional stability and therefore are especially suitable for many automotive exterior body panel applications. The processing of such glass fiber mat reinforced RIM is relatively simple. The process involves placing a glass fiber mat in a mold cavity and injecting RIM material into the closed mold such that the RIM material is soaked through the glass fiber mat. A completed plastic part can be removed after it is cured in the mold.

A typical RIM material used in this process is a polyurethane based material produced from two components, an isocyanate and a polyol. The in-mold pressure of such a material system used in A RIM process is typically less than 50 psi. As a consequence, low cost tooling having low clamping force can be used for the process.

The dimensional stability of glass fiber mat reinforced RIM material is greatly improved over that of a RIM material reinforced with milled glass. As a matter of fact, the dimensional stability of glass fiber mat reinforced RIM is even superior to that of aluminum. This superior dimensional stability is achieved while other traditional benefits of RRIM, i.e., stiffness, strength, and ease of processing are maintained.

In the processing of glass fiber mat reinforced RIM materials, a new problem was discovered. This is generally called a fiber readout defect observed in the surface layer of a glass fiber mat reinforced RIM part. It is a particularly serious problem when panels are used for exterior automotive body applications where aesthetic quality is of prime importance.

The fiber readout problem is caused largely by the presence of glass fiber in the surface layer of a plastic panel. When a panel is situated in a mold under compression, resin material located between the panel surface and a glass fiber in the surface layer of the panel is under higher pressure than that located not adjacent to a glass fiber. As a consequence, when the part is demolded, the cured resin material located adjacent to a glass fiber will expand more than the resin material not adjacent to a glass fiber. This results in a panel having a surface showing protruding contours of glass fibers which are located immediately below the surface of the panel, commonly known as the fiber readout phenomenon.

Numerous efforts have been made to correct the fiber readout defect observed in glass fiber mat reinforced plastic panels. These efforts include the inventor's previous U.S. patent application Ser. No. 669,824, filed Nov. 9, 1984 and assigned to the assignee of this invention. In that application, the inventor has shown that the application of a top coating layer in a secondary moding process could conceal fiber readout if pressure was released before the end of the molding cycle. However, this process requires delicate process control which may not be feasible in a mass production process.

It is therefore an object of the present invention to provide a method of producing glass fiber mat reinforced RIM panels without the fiber readout defect which is readily adaptable to a mass production process.

It is another object of the present invention to provide a method of making glass fiber mat reinforced RIM panels where glass fibers are kept away at a distance from the surface in a precisely controlled manner to avoid fiber readout defect.

It is yet another object to the present invention to provide a method of making glass fiber mat reinforced RIM panels without the fiber readout defect such that panels can be readily decorated to produce a predecorated surface for automotive exterior body panel applications.

SUMMARY OF THE INVENTION

I have recognized that the fiber readout defect is caused by those glass fibers which are entrapped in a layer of plastic material immediately adjacent to the surface of the panel. Therefore, I have devised a novel technique by which glass fibers are kept away from the surface plastic layer at a distance during molding of such panels in a precisely controlled manner.

In accordance with a preferred practice of my invention, a method of producing glass fiber mat reinforced plastic panels without the fiber readout defect can be carried out by the following operative steps.

First, a set of matched metal mold is prepared of which at least one of the two opposing interior mold surfaces is etched with equally spaced, closely packed minute pockets or valleys of truncated pyramid shape. One or more layers of glass fiber mats are then placed in the mold. After closing the two halfs of the mold together, polyurethane resin is injected into the mold cavity. A sufficient time is allowed for the polyurethane to cure before the mold is opened. A fiber glass mat reinforced plastic panel of textured surface having a multiplicity of minute truncated pyramid like protuberances is thus produced. Glass fibers are excluded from the protuberances molded on the panel surface in such a way that none of the fiber readout defect is shown on the surface.

Optionally, a predecorated plastic panel can be obtained by laminating a predecorated plastic sheet to such a molded panel. The lamination process can be easily performed by first coating the molded panel surface with a urethane type resin material and then vacuum forming a predecorated plastic sheet over it. The predecorated plastic sheet can be either a prepainted sheet meeting class A finish requirements of the automotive industry or an otherwise predecorated sheet. A finished panel produced from this lamination process can be readily used as an automotive exterior body panel without further painting or decorating.

DESCRIPTION OF THE DRAWINGS

Other objects, features and advantages of the present invention will become apparent upon consideration of the specification and the appended drawings, in which.

DESCRIPTION OF THE PREFERRED EMBODIMENT

My invention is a unique technique which allows for the production of glass fiber mat reinforced plastic panels without the fiber readout defect. The technique is to first make a mold surface having a plurality of closely-packed upstanding projections defining a plurality of flat-bottomed valleys of truncated pyramid shapes therebetween. RM material is then injected into the mold after glass fiber mats are placed in the mold. The upstanding projections on the surface of the mold contact the glass fiber mats in such a way that the mats are submerged inside the panel and kept away from the panel surface.

Glass fiber mat reinforced plastic panels thus produced have textured surfaces comprising a large number of closely packed truncated pyramids. The dimensions of the pyramids are carefully chosen such that glass fiber bundles in the glass fiber mat cannot enter the pyramids. This results in a top surface of the plastic panel containing a large number of truncated pyramids which are formed competely of the RIM material without any content of fiber glass. In other words, all the fiber glass bundles are kept away from the surface of the plastic panel by a distance approximately equal to the height of the pyramid. A plastic panel having a surface that does not contain any glass fiber bundles in the surface layer immediately adjacent to the surface is thus produced. The profiles of the glass fibers are not reproduced on the surface of the panel after molding, i.e., the defect of fiber readout is avoided.

Figure 1:
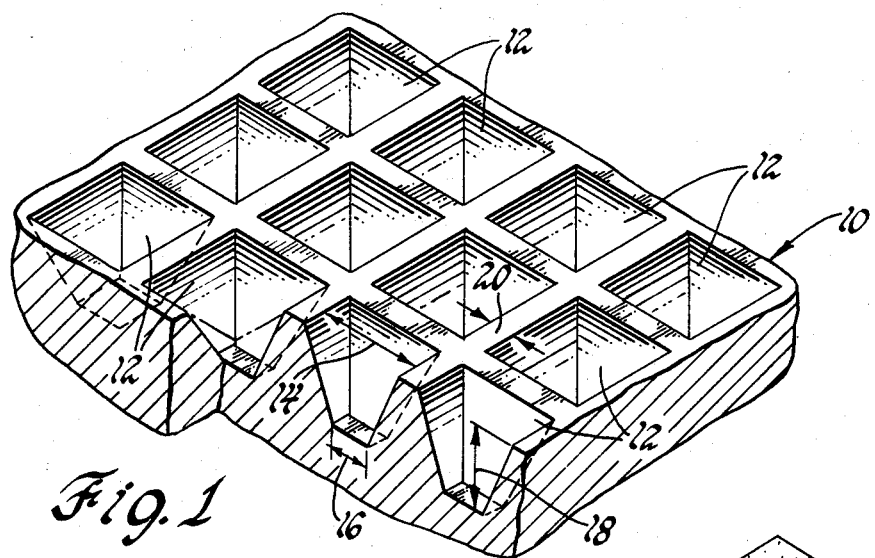
FIG. 1 is an enlarged perspective view of an interior mold surface having minute pockets of truncated pyramid shape.

Referring initially to FIG. 1, an enlarged cut-away surface of a mold 10 containing numerous valleys of truncated pyramid shape is shown. The dimensions of valley 12 of truncated pyramid shape are carefully chosen such that glass fiber bundles can not enter such valley. For instance, suitable dimensions for the pyramid are 0.4 mm of the base width 14 of the pyramid, 0.2 mm for the top width 16 of the pyramid; 0.25 mm for the height 18 of the pyramid, and 0.05 mm for the upstanding projection or the ridge 20 between the bases of the pyramids. These dimension were found suitable for the glass fiber mat used in my invention which is M-8605 (density 0.04 g/cm$^2$) supplied by Owens-Corning Glass Co. Ridge 20 serves to push down the glass fiber mat during molding and keeps the glass fibers away from the panel surface. The technology of making continuous glass fiber mats is well known today and can be found in many technical publications. For instance, it is described in the *Encyclopedia of Polymer Science and Technology*, Vol. 6, page 639. I have also found that a suitable way of etching such valleys in the surface of a metal mold is by the photographic method.

After a mold surface is prepared as that depicted in FIG. 1, the molding operation of the plastic panel can be performed. Glass fiber mats are first placed into the open mold and positioned. The two matched metal molds are then closed together and a polyurethane resin material is injected into the mold cavity. The upstanding projection or the ridge 20 (FIG. 1) on the surface of mold 10 contacts the glass fiber mats in such a way that the mats are submerged inside the panel and kept away from the panel surface. Injection molding of polyurethane type RIM resin is performed by the standard practice used in the plastics industry. The polyurethane resin utilized in this invention is composed of two components, an isocyanate and a polyol. The isocyanate was supplied by the Upjohn Co. as Isonate 181 within an equivalent weight of 183.3. The polyol component NIAX 11-34 was supplied by Union Carbide Co. which has an equivalent weight of 1516.2. An ethylene glycol chain extender was used in the formulation which is supplied by Fisher Scientific as grade AR. The catalyst used in this formulation was Formex UL-29 supplied by the Whitco Chemical Co. An internal mold release agent was used to ease processing which was supplied by the Specialty Products Co. as their KANTSTIK FX-7. The formulation of this polyurethane composition is shown in Table 1.

TABLE 1

| Formulation of Polyurethane Resin | |
|---|---|
| Component | Weight Percent |
| Polyol (Niax 11-34) | 50.0 |
| Isonate 181 (Upjohn) | 44.0 |
| Ethylene Glycol (Fisher Scientific, grade AR) | 6.0 |
| Internal Mold Release (Kantstik FX-7) | 0.2 |
| Catalyst (Formez UL-29) | 0.01 |

Figure 2:
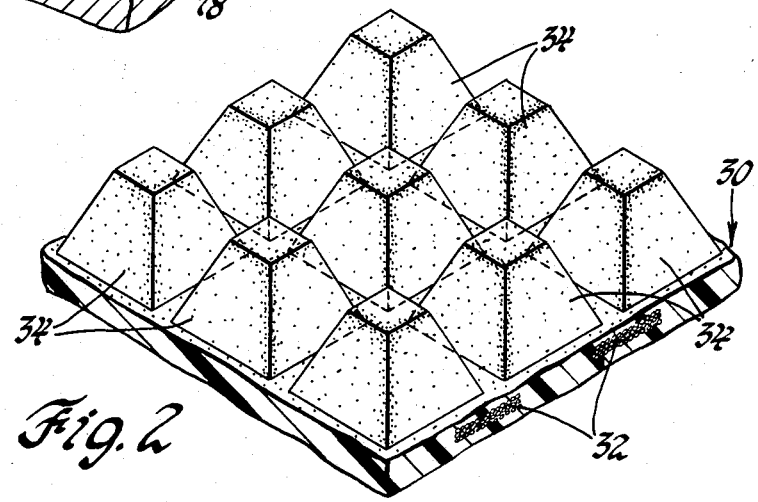
FIG. 2 is an enlarged perspective view of a glass fiber mat reinforced plastic panel having minute truncated pyramid shaped protuberances produced from a mold depicted in FIG. 1.

After injection, the urethane panel is allowed to cure in the mold for 5 minutes at 67° C. After the panel is demolded and cooled to room temperature, it showed a surface containing a very large number of truncated pyramids. An enlarged sectional view of this surface is shown in FIG. 2. The top layer 30 of the plastic panel containing the pyramids are shown in FIG. 2. Glass fiber bundles 32 were too large to enter valleys 12 (FIG. 1) and are thus kept away from pyramids 34. A panel surface having truncated pyramids which do not contain any glass fibers is thus produced.

It must be noted that even though my preferred practice of building protuberances on a plastic panel surface is described in terms of truncated pyramids, the practice of this invention is by no means limited to only such shape. For instance, tapered cylindrical shaped pyramids or tapered triangular shaped pyramids or even non-tapered variations of such shapes should work equally well. The critical requirement to be met here is that the dimensions of the protuberances must be chosen such that the glass fiber bundles contained in the fiber glass mat cannot enter the valleys during the molding process. In other words, the valleys must be filld completely by the resin material. By keeping the fibers at a distance from the surface of the panel, the defect caused by fiber readout is avoided.

The plastic panels having a textured surface can be used as is, without further decorating or can be painted and used in automotive interior applications, such as seat backs and load floors. In an alternate embodiment which is more adaptable to automotive exterior body panel applications, a predecorated plastic sheet or film can be laminated to the plastic panel surface to make it a predecorated plastic panel. A thin layer of approximately 0.025 mm of the same urethane resin, but without the mold release additive, is brushed over the panel surface and a prepainted carrier film if vacuum formed against it. This is performed in a vacuum box where a preheated sheet (to approx. 67° C.) is stretched in a frame and positioned over a plastic panel. Vacuum is applied by a vacuum pump (28 in Hg vacuum) through the bottom side of the box while the plastic panel is being pushed up to meet the plastic sheet. The vacuum forming cycle time was about 5 minutes. An enlarged cross-sectional view of a laminated panel is shown in FIG. 3.

Figure 3:
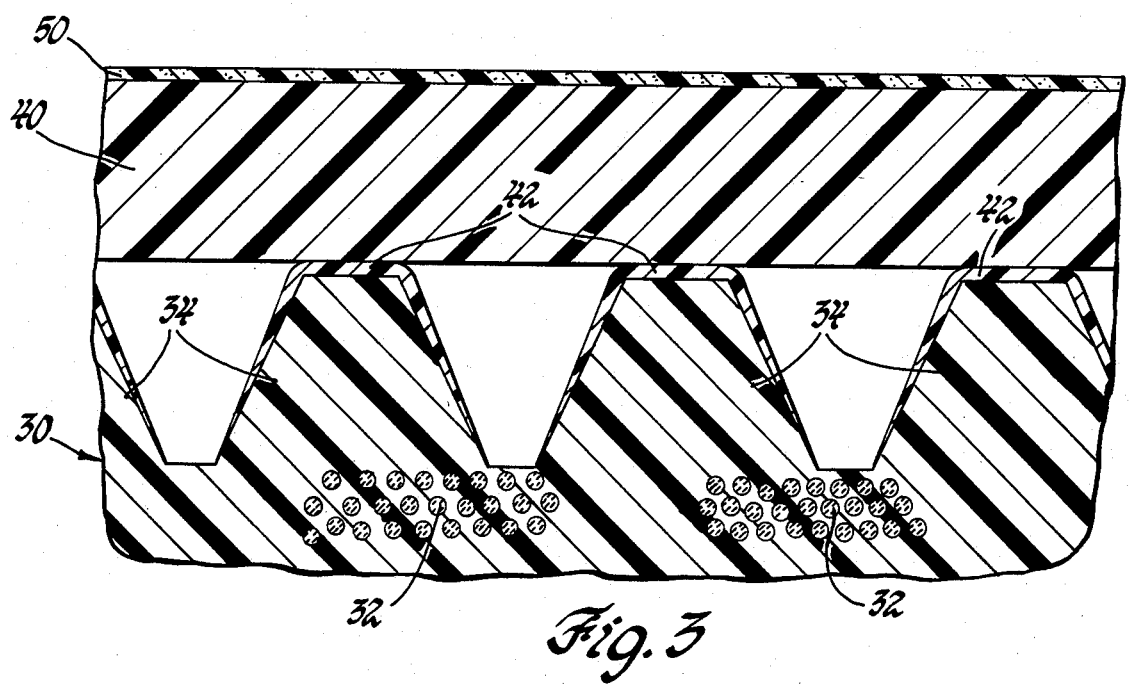
FIG. 3 shows an enlarged sectional view of the alternate embodiment of a predecorated panel where a predecorated plastic film is vacuum formed and laminated to the glass fiber mat reinforced plastic panel by first coating the panel surface with a urethane type resin.

FIG. 3 shows that a prepainted plastic film 40 is laminated to a plastic panel 30 by a layer of urethane resin 42. The prepainted plastic sheet 40 has a paint layer 50 sprayed on it prior to the lamination process to give it a finished appearance. A finish meeting the automotive class-A finish standard without fiber readout defect can be obtained by this technique.

The use of prepainted plastic film eliminates the cost of painting after lamination. However, if it is desired, unpainted films can be used equally well to cover the panel surface and painting can be carried out in a subsequent process. This is possible because the distance between the fibers and the panel surface can be adjusted by my novel technique such that the part will not show fiber readout even after the baking temperature of the paint.

While my invention has been described in terms of a preferred embodiment thereof, it is to be appreciated that those skilled in the art will readily apply these teachings to other possible variations of the invention.

The embodiment of the invention in which an exclusive property or privilege is claimed are defined as follows:

1. A reinforced plastic panel comprising a mat of glass fibers inpregnated with a plastic material, said panel having a textured surface formed concurrently with said panel and comprising a multiplicity of minute truncated pyramids of substantially equal height, each of said pyramids being substantially free of glass fibers and having a surface substantially parallel to the plane of said panel, whereby said surface of said pyramid defines the outermost surface of said reinforced panel which is free of the attendant undesirable appearance otherwise resulting from the presence of said fibers on said surface and is readily decorable in a subsequent process.

2. A predecorated plastic panel comprising a predecorated plastic sheet laminated by adhesive means to a substrate molded of glass fiber mat impregnated with plastic material, said substrate having a textured surface formed concurrently with said substrate and comprising a multiplicity of minute truncated pyramids of substantially equal height, each of said pyramids being substantially free of glass fibers and having a surface substantially parallel to the plane of said substrate whereby said surface of said pyramid defines the outermost surface of said substrate which is free of the attendant undesirable appearance otherwise resulting from the presence of said fibers on said substrate surface.

* * * * *